United States Patent
Coulmeau

(10) Patent No.: US 7,904,213 B2
(45) Date of Patent: Mar. 8, 2011

(54) METHOD OF ASSISTING IN THE NAVIGATION OF AN AIRCRAFT WITH AN UPDATING OF THE FLIGHT PLAN

(75) Inventor: François Coulmeau, Seilh (FR)

(73) Assignee: Thales (FR)

( * ) Notice: Subject to any disclaimer, the term of this patent is extended or adjusted under 35 U.S.C. 154(b) by 1028 days.

(21) Appl. No.: 11/686,337

(22) Filed: Mar. 14, 2007

(65) Prior Publication Data

US 2007/0219678 A1    Sep. 20, 2007

(30) Foreign Application Priority Data

Mar. 14, 2006 (FR) ..................................... 06 02217

(51) Int. Cl.
    *G01C 23/00* (2006.01)
(52) U.S. Cl. ................... 701/3; 701/4; 701/11; 340/945; 244/76 R; 244/175
(58) Field of Classification Search ................. 701/3, 14; 340/945, 947, 948, 961; 73/178 R
    See application file for complete search history.

(56) References Cited

U.S. PATENT DOCUMENTS

| | | | | |
|---|---|---|---|---|
| 5,340,061 | A * | 8/1994 | Vaquier et al. ................. | 244/175 |
| 5,995,901 | A * | 11/1999 | Owen et al. ..................... | 701/202 |
| 6,263,263 | B1 * | 7/2001 | Shehi et al. ....................... | 701/3 |
| 6,571,155 | B2 * | 5/2003 | Carriker et al. ................... | 701/3 |
| 6,633,810 | B1 * | 10/2003 | Qureshi et al. .................. | 701/206 |
| 7,177,731 | B2 * | 2/2007 | Sandell et al. .................... | 701/3 |
| 7,366,591 | B2 * | 4/2008 | Hartmann et al. ................ | 701/4 |
| 7,835,825 | B2 * | 11/2010 | Coulmeau et al. ................ | 701/3 |
| 2005/0049762 | A1 * | 3/2005 | Dwyer ............................. | 701/3 |
| 2005/0091036 | A1 * | 4/2005 | Shackleton et al. ............. | 704/9 |
| 2005/0203676 | A1 * | 9/2005 | Sandell et al. .................... | 701/3 |
| 2007/0129855 | A1 | 6/2007 | Coulmeau | |
| 2007/0179703 | A1 | 8/2007 | Soussiel et al. | |
| 2007/0219679 | A1 * | 9/2007 | Coulmeau ......................... | 701/3 |
| 2008/0154486 | A1 * | 6/2008 | Coulmeau ..................... | 701/120 |
| 2010/0030401 | A1 * | 2/2010 | Rogers et al. ..................... | 701/3 |

FOREIGN PATENT DOCUMENTS

| | | | |
|---|---|---|---|
| EP | 1658473 | A2 * | 5/2006 |
| EP | 2159544 | A1 * | 3/2010 |
| FR | 2898672 | A1 * | 9/2007 |

(Continued)

OTHER PUBLICATIONS

Lindenfeld, Ron, "What is an FMS?", Flight Management Systems (5 pages); http://www.ultranet.com/.about.marzgold//FAQ-FMS.html; [Accessed Jun. 3, 2002].*

(Continued)

*Primary Examiner* — Cuong H Nguyen
(74) *Attorney, Agent, or Firm* — Lowe Hauptman Ham & Berner, LLP

(57) ABSTRACT

The invention relates to a method of assisting in the navigation of an aircraft comprising a step for updating a flight plan according to a new clearance received on board by a ground/onboard communication system. The clearance comprises an action conditional on the flight plan linked to a floating point of the path defined by an altitude constraint of the aircraft; on receipt of the new clearance, the update is performed directly by means of the FMS linked to the communication system. This is a predictive method.

16 Claims, 5 Drawing Sheets

FOREIGN PATENT DOCUMENTS

Figure 1:
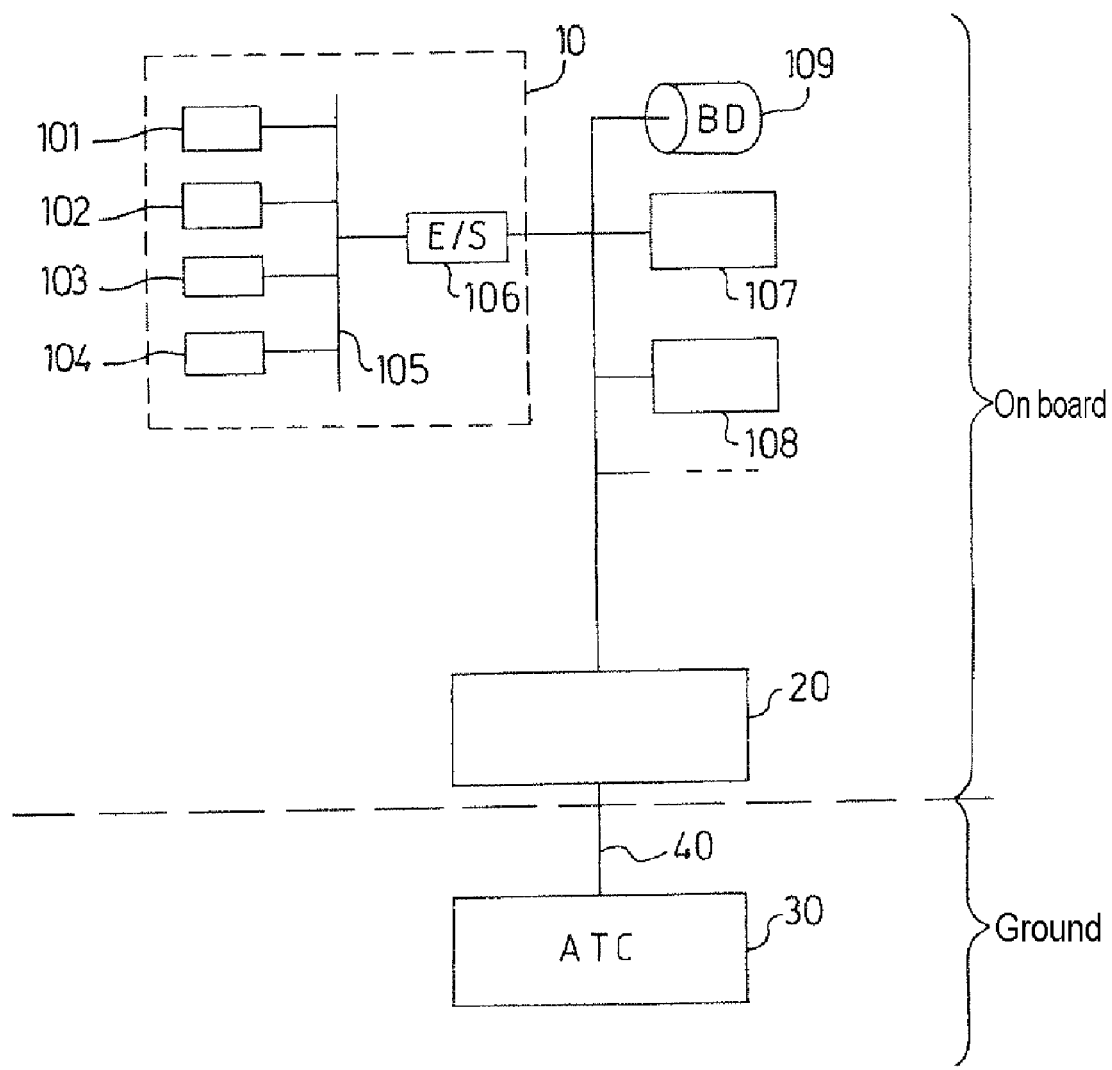

FR 2910124 A1 * 6/2008
WO WO 2005038748 A2 * 4/2005

OTHER PUBLICATIONS

Hutchins, Edwin, "The Integrated Mode Management Interface," Department of Cognitive Science, University of California, San Diego, Sep. 17, 1996.*

Painter et al., "Decision Support for the General Aviation Pilot," Systems, Man, and Cybernetics, IEEE International Conference on Computational Cybernetics and Simulation, Orlando, FL, Oct. 12-15, 1997, pp. 88-93.*

Lin C E et al, "An Automated TCA Monitor System for Air Traffic Control," Aerospace and Electronics Conference, 1994. Naecon 1994., Proceedings of the IEEE 1994 National Dayton.*

Assessment of controller situation awareness in future terminal RNAV operations; Smith, E.C.; Digital Avionics Systems Conference, 2007. DASC '07. IEEE/AIAA 26$^{th}$; Digital Object Identifier: 10.1109/DASC.2007.4391954 Publication Year: 2007 , pp. 6.B.3-1-6.B.3-13.*

Flight simulations using time control with different levels of flight guidance; De Smedt, D.; Putz, T.; Digital Avionics Systems Conference, 2009. DASC '09. IEEE/AIAA 28$^{th}$; Digital Object Identifier: 10.1109/DASC.2009.5347544; Publication Year: 2009 , pp. 2.C.5-1-2.C.5-15.*

Research Progress on an Automation Concept for Surface Operation with Time-Based Trajectories; Cheng, V.H.L.; Integrated Communications, Navigation and Surveillance Conference, 2007. ICNS '07; Digital Object Identifier: 10.1109/ICNSURV.2007.384166; Publication Year: 2007 , pp. 1-13.*

Using 4DT FMS data for green approach, A-CDA, at Stockholm Arlanda airport; Friberg, N.; Digital Avionics Systems Conference, 2007. DASC '07. IEEE/AIAA 26$^{th}$; Digital Object Identifier: 10.1109/DASC.2007.4391824; Publication Year: 2007 , pp. 1.B.3-1-1.B.3-9.*

Flight validation of downlinked flight management system 4D trajectory; Wichman, K.D.; Klooster, J.K.; Bleeker, O.F.; Rademaker, R.M.; Digital Avionics Systems Conference, 2007. DASC '07. IEEE/AIAA 26$^{th}$; Digital Object Identifier: 10.1109/DASC.2007.4391833; Publication Year: 2007 , pp. 1.D.1-1-1.D.1-10.*

Terminal area trajectory synthesis for air traffic control automation; Slattery, R.A.; American Control Conference, 1995. Proceedings of the; vol. 2; Digital Object Identifier: 10.1109/ACC.1995.520941; Publication Year: 1995 , pp. 1206-1210 vol. 2.*

Raja Parasuraman et al., "A Model for Types and Levels of Human Interaction with Automation", IEEE Transactions on Systems, Man and Cybernetics. Part A; Systems and Humans, IEEE Service Center, Piscataway, NJ, US, vol. 30, No. 3, May 2000, XP011056321; ISSN: 1083-4427; pp. 287,289,293.

* cited by examiner

METHOD OF ASSISTING IN THE NAVIGATION OF AN AIRCRAFT WITH AN UPDATING OF THE FLIGHT PLAN

RELATED APPLICATIONS

The present application is based on, and claims priority from, Application Number 06 02217, filed Mar. 14, 2006, the disclosure of which is hereby incorporated by reference herein in its entirety.

The invention relates to assistance in the navigation of an aircraft and, more specifically, management of the onboard flight plan.

It will be remembered that an aircraft is equipped with a navigation aid system called FMS (Flight Management System). This exchanges a variety of information with the ground and with other equipment on the aircraft. It communicates with the crew of the aircraft via man-machine interfaces.

The flight management system helps the crew in programming the flight plan before take-off and in following the path of the flight plan from take-off through to landing. Its assistance in programming the flight plan consists on the one hand in plotting, in the horizontal and vertical planes, a sketch of the path formed by a succession of waypoints (WP) associated with various clearances, such as altitude, speed, heading or other factors and on the other hand in calculating, also in the horizontal and vertical planes, the path that the aircraft must follow to complete its mission.

When preparing the programming of the flight plan, the crew inputs into the flight management system, explicitly or implicitly, the geographic coordinates of the waypoints and the clearances that are associated with them, and obtains from the flight management system a sketch of the path, a flight path and a flight plan. The path is made up of a chain of segments linking pairs of waypoints from the starting point through to the destination point, and arcs of circle, both to ensure the heading transitions between segments at the waypoints and to follow certain curved segments. The path sketch and the path are displayed on a navigation screen to enable the crew to check their relevance. The flight plan comprises the horizontal and vertical paths together with the clearances. The vertical path is normally designated vertical profile.

Before take-off, the onboard flight plan of the aircraft and that of the air traffic control (ATC) authority are identical.

During the flight, unforeseen events occur that will modify the flight plan. These are, for example, changes in the weather, traffic, even onboard failures, etc. These events are communicated to ATC when it has no knowledge of them. ATC can then transmit to a ground/onboard communication system (CMU, standing for Communication Management Unit) linked to the FMS, new clearances taking into account these events, via, for example, a digital link C/P-DLC (Controller/Pilot—Data Link Communication). The crew takes note of these new clearances through a man-machine interface of the FMS or of the CMU.

Clearances with or without impact on the flight plan are differentiated. Among the clearances that have an impact on the flight plan, some can be implemented automatically in the FMS via existing functions, but are, in fact, performed by the FMS only manually, at the request of the pilot. These clearances are, for example:
- modify a part of the flight plan,
- notify ATC of the state of the aircraft,
- conditional action by which ATC asks for an action to be performed when a condition is met.

The conditional clearances are of three types
- AT [position] PERFORM [action to be performed], the [position] parameter representing a geographic position,
- AT [time] PERFORM [action to be performed], the [time] parameter representing a time,
- AT [altitude] PERFORM [action to be performed], the [altitude] parameter representing an altitude defined according to various formats.

The action to be performed is of the "CLIMB", "DEVIATE", "REDUCE SPEED TO", and other such types.

In the case of a conditional action, only the "condition" part, that is the AT [parameter] part, is currently (i.e. since 2000, as part of the so-called FANS 1/A implementation) transmitted to the FMS to be monitored, but the "action" part is not transmitted to the FMS.

When this action is transposable by a function of the FMS, it is activated by the pilot who manually modifies the FMS flight plan to perform the "action" part of the clearance, when the crew is informed by the FMS that the condition is met. The FMS then performs an updating of the predictions on the flight plan and the path is modified accordingly.

However, most of the actions to be performed cannot be transposed by a function of the FMS. Among these, there are those that are linked to a floating point of the horizontal and/or vertical paths. The term "floating point of a path" is used to denote a point whose geographic coordinates are not fixed, that is, whose latitude and longitude coordinates are not fixed, unlike the points whose coordinates are fixed, such as those of a town.

The description below addresses the conditional actions linked to a floating point of the path, represented by an altitude. These clearances are collated in a normative document of the International Civil Aviation Organization (ICAO), known by the name of "SARPS ATN" or Doc9705). They are associated with a reference of the form "UM xxx" returned to in the description below.

The current FMS systems do not make it possible to manage clearances consisting in making lateral or vertical modifications to a floating position defined by its altitude.

On an instruction from the pilot, the modified path can be activated as a reference FMS path and transmitted to the guidance system of the aircraft (FGS, standing for Flight Guidance System, comprising, among other things, the automatic pilot and the automatic throttle) and to ATC via the communication interface CMU. The FMS and ATC then have the same flight plan.

When this action cannot be transposed by a function of the FMS, it is performed manually by the pilot, either by acting directly on the flight controls, or by acting on the automatic pilot and the automatic throttle.

Whether a clearance can or cannot be transposed by the FMS, the intervention of the pilot to perform it has a number of drawbacks:
- the interpretation of the clearance can vary from one crew to another because, in particular, of the understanding of the language used, the quality of reception of the instruction, etc.,
- an application of the clearance, variable from one crew to another,
- an inconsistency between the onboard flight plan and that available to ATC,
- an exit from the FMS mode to switch to a so-called "selection" mode when carrying out the clearance which generates an inconsistency between what the radar operator on the ground observes compared to that which was predicted in the flight plan.

The aim of the invention is to enable the flight plan to be managed and to execute it on board by avoiding these drawbacks and, in particular, to enable ATC and the FMS to permanently have the same flight plan.

With this aim, the subject of the invention is a method of assisting in the navigation of an aircraft comprising a step for updating a flight plan which comprises a lateral path and a vertical profile associated with clearances, the flight plan being updated according to a new clearance originating from an air traffic control authority and received on board by a ground/onboard communication system. It is mainly characterized in that the clearance comprises an action conditional on the flight plan linked to a floating point of the lateral path and/or of the vertical profile, defined by an altitude constraint of the aircraft, and in that, on receipt of the new clearance, the update is performed directly by means of a flight management system, called FMS, linked to the communication system.

Other characteristics and advantages of the invention will become apparent from reading the detailed description that follows, given by way of non-limiting example, and with reference to the appended drawings, in which:

FIG. 1 diagrammatically represents an exemplary FMS computer,

FIG. 2 diagrammatically illustrate an exemplary clearance "AT Nd DIRECT TO Pd", in a typical case in the climbing phase, FIG. 3 diagrammatically illustrate an exemplary clearance "AT Nd DIRECT TO Pd", in a "Wilkinson" case in the climbing phase, FIG. 4 diagrammatically illustrate an exemplary clearance "AT Nd DIRECT TO Pd" in the descent phase.

Figure 5:
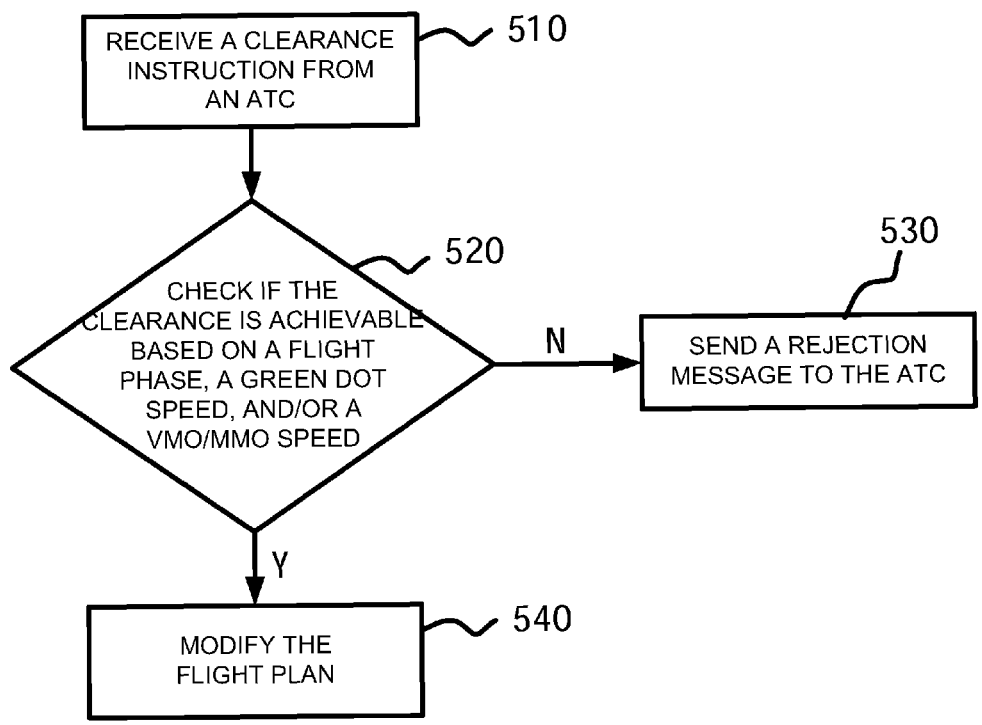

FIG. 5 is a flow chart of a method for assisting in the navigation of an aircraft according to some embodiments.

An FMS computer 10, represented in FIG. 1, conventionally comprises a central processing unit 101 which communicates with an input-output interface 106, a program memory 102, a working memory 103, a data storage memory 104, and circuits 105 for transferring data between these various elements. The input-output interface is linked to various devices such as a man-machine interface 107, sensors 108, etc. A performance table, specific to the aircraft, and the horizontal and vertical paths of the flight plan are stored in the data memory. The performance table contains the performance characteristics and limitations of the aircraft, such as the speed and gradient limitations of the aircraft, its maximum altitude, its stall speed, its consumption, its turn radius, its roll, and so on.

This FMS computer 10 is linked to a ground/onboard communication system 20 which is in turn linked to ATC 30 via a C/P-DLC digital link 40.

New FMS functions linked to clearances relating to a floating point in altitude originating from ATC are created in the program memory 102.

Before describing these new functions, some definitions are reviewed below.

The altitude A/C Alt is the altitude of the aircraft.

The altitude ARR Alt is the altitude of the airport of arrival.

The level Min_level_cruise is a minimum level such that a descent to a level greater than this minimum level is interpreted as a "STEP DESCENT" when cruising and a descent to a level below this minimum level is interpreted as a descent phase constraint. Typically, Min_level_cruise is equal to FL250, that is 25000 ft above the isobar 1013.25 hPA.

A waypoint is a point whose latitude and longitude coordinates are fixed.

The following points are pseudo waypoints characteristic of the levels of the cruising flight phase.

S/C (or Start of Climb) is the climb start point to change from one level to another.

T/C (or Top of Climb) is the climb end point to change from one level to another.

S/D (or Start of DES) or T/D (or Top of DES) is the descent start point to change from one level to another.

The so-called "GREEN DOT" longitudinal speed is the speed providing the best lift-over-drag ratio in clean configuration, that is, when the leading-edge slats and the flaps of the aircraft are retracted. It should be remembered that the speed vector of the aircraft comprises two components, the longitudinal speed (or just "speed") and the vertical speed, also called vertical rate, respectively considered in a horizontal plane and in the vertical direction, perpendicular to this plane. VS(GREEN DOT) is used to denote the vertical rate resulting from maintaining the "GREEN DOT" longitudinal speed for a given thrust; thus, more generally, VS (determined longitudinal speed) is used to denote the vertical rate resulting from a longitudinal speed and a determined thrust and VL (determined vertical rate) is used to denote the longitudinal speed resulting from a determined vertical rate and thrust.

VMO/MMO is used to denote the maximum longitudinal speed torque and mach.

Time Marker is used to denote a pseudo waypoint which is a floating point, in HHMMSS format, displayed on the path at the place where the time HH:MM:SS will be reached.

A waypoint or "Fix" is a point whose latitude/longitude coordinates are fixed.

A "Leg" is an element of the flight plan describing how to reach a waypoint if the termination of the leg is a "Fix", or the event that is the termination of the leg (altitude, interception of next leg). These concepts are described in the normative aeronautical document Arinc 702A.

The Nd parameter comprises a numerical value and a reference value.

Several altitude references exist in aeronautics:

QFE is the height relative to a terrain (in feet on in m)

QNH is the altitude relative to the mean sea level (in feet or in m)

QNE is the altitude relative to the 1013.25 hPa isobar, generally expressed as "flight level" (FL). For example FL110 corresponds to 11 000 feet above the 1013.25 hPa isobar.

GNSS is the altitude relative to a satellite reference (for example WGS84 for GPS).

Etc.

During the take off or climb phase and the descent or approach phase, the ATM (Air Traffic Management) works in QFE or QNH mode below a so-called "transition" altitude, and in QNE mode above.

A conversion is therefore performed for dealing with the various altitude parameters in one and the same reference. For example everything can be converted to QNE.

FIG. 5 is a flow chart of a method for assisting in the navigation of an aircraft according to some embodiments. In FIG. 5, a method of modifying a flight plan of an aircraft by a flight management system onboard the aircraft is illustrated. A person of ordinary skill in the art will appreciate that the method of FIG. 5 is merely illustrative. In some embodiments, operations of the method need not to be performed according to the order as depicted in FIG. 5. In some other embodiments, other operations may be performed before, during, or after the method of FIG. 5.

In operation 510, the FMS receives a clearance instruction from an air traffic control authority on the ground. The clearance instruction has an action to be performed upon occurrence of a condition. Then in operation 520, the FMS determines if modifying the flight plan is achievable according to: (a) the clearance instruction; (b) a flight phase of the aircraft;

and (c) at least one of a longitudinal speed of the aircraft providing the best lift-over-drag ratio in a clean configuration of the aircraft (the Green Dot) and a maximum longitudinal speed of the aircraft (the VMO/MMO). If it is determined to be not achievable, in operation 530, the FMS sends a rejection message to the air traffic control authority through the ground/onboard communication system 20. If it is determined that modifying the flight plan according to the clearance instruction and the pseudo-waypoint is achievable, the FMS modifies the flight plan in operation 540.

More descriptions regarding the implementation of the method of FIG. 5 are provided below using specific example clearance instructions.

The following clearances are now considered. They are based on predictive algorithms which take account of the clearance in the flight plan, on receipt.

(UM 26) The clearance being of the form "climb to reach a determined level Nd at or before a determined time Hd" or "CLIMB TO REACH Nd BY Hd", the updating of the flight plan which comprises segments consists in introducing the following programme into the flight plan of the FMS.

If A/C Alt>=Nd, then we reject the clearance through a message "UNABLE" to ATC
  Else
    If the flight phase is a takeoff or climb phase:
      If Nd>Max(CRZ FLi)
        (in this case, the clearance asks to reach a cruising altitude above current maximum cruising)
        the cruising level is reassigned to the level Nd,
        any altitude constraints on the climb procedure points ahead of the aircraft are erased,
        the time HHMMSS1 at which the level Nd is reached is verified via the new predictions
        If HHMMSS1<Hd, then
          the request is accepted, such that
        Else (it is necessary to climb more quickly)
          a prediction is performed by taking as engine thrust the climb thrust (MCL=Max Climb), and as longitudinal speed Green Dot. A time HHMMSS2 is obtained.
          If HHMMSS2>Hd then the clearance is rejected through a message "UNABLE" to ATC since it is impossible to reach the altitude requested, even climbing with the maximum rate,
          Else
            the airplane speed is constrained to GREEN DOT and the request is accepted.
          Endif
        Endif
      Else, if Min(CRZ FLi)<Nd<Max(CRZ FLi)
        (in this case, the clearance asks to reach an intermediate cruising altitude)
        The cruising level is reassigned to the level Nd: this erases the lower levels and retains the higher levels.
        The same calculations are then performed as for the case Nd>max(CRZ Fli).
      Else (we have Nd<Min(CRZ FLi))
        (in this case, the clearance asks to reach a climb altitude)
        A pseudo waypoint "Time Marker" is created with the value of the parameter Nd on the flight plan.
        The altitude constraints between the aircraft and cruising are erased.
        An altitude constraint of AT (that is to say maintain altitude) is placed on the value of the parameter Nd on the pseudo waypoint time Marker.
        If the constraint is accepted, that is to say achievable then
          the request is accepted
        Else,
          a prediction is performed by taking as engine thrust the climb thrust (MCL=Max Climb) and as longitudinal speed Green Dot.
          If the constraint is accepted, then
            The request is accepted
          Else, the clearance is rejected through a message "UNABLE" to ATC.
          Endif
        Endif
      Endif
    Else, if the flight phase is a cruising phase
      The same calculations are performed as in the climb phase, for the case
      Nd>Max(CRZ Fli) and current level of the aircraft<Nd<Max(CRZ Fli)
    Else (the flight phase is a descent phase),
      the clearance is rejected through a message "UNABLE" to ATC
    Endif (UM27) The clearance being of the form "climb to reach a determined level Nd at or before a determined position Pd" or "CLIMB TO REACH Nd by Pd", the update of the flight plan which comprises segments consists in introducing the following programme into the flight plan of the FMS.

If A/C Alt>=Nd, then
  the clearance is rejected through a message "UNABLE" to ATC Else
    If the flight phase is a climb phase ("TAKE OFF" or "CLIMB"):
      If Nd>Max(CRZ FLi)
        (in this case, the clearance asks to reach a cruising altitude above current maximum cruising)
        The cruising level is reassigned to the level Nd
        Any altitude constraints on the point situated between the aircraft and the parameter Pd are erased.
        The altitude Alt-Pos predicted at the point Pd is verified via the new predictions.
        If Alt-Pos=Nd, then
          The request is accepted, such that
        Else (it is necessary to climb more quickly)
          A prediction is performed by taking as engine thrust the climb thrust (MCL=Max Climb), and as longitudinal speed Green Dot. An altitude prediction Alt-Pos2 is obtained at the point Pd
          If Alt-Pos2<Nd then
            the clearance is rejected through a message "UNABLE" to ATC since it is impossible to reach the altitude requested, even by climbing with the maximum rate,
          Else
            The longitudinal speed of the aircraft is constrained to GREEN DOT
            The request is accepted.
          Endif
        Endif
      Else, if Min(CRZ FLi)<Nd<Max(CRZ FLi)
        (in this case, the clearance asks to reach an intermediate cruising altitude)
        The cruising level is reassigned to the level Nd: this erases the lower levels and preserves the higher levels.
        The same calculations are then performed as for the case Nd>Max(CRZ Fli).
      Else (we have Nd<Min(CRZ FLi))
        (in this case the clearance asks to reach a climb altitude)
        The altitude constraints between the aircraft and the points situated upstream of the parameter Pd are erased.

An altitude constraint of AT type (that is to say maintain altitude) is placed at the value of the parameter Nd on the point Pd.
    If the constraint is accepted (i.e. achievable), then
        the request is accepted
    Else,
        a prediction is performed by taking as engine thrust the climb thrust (MCL=Max Climb), and as longitudinal speed of the aircraft Green Dot.
        If the constraint is accepted, then
            The request is accepted
        Else,
            the clearance is rejected through a message "UNABLE" to ATC
        Endif
    Endif
    Endif
Else, if the flight phase is a cruising phase
    The same calculations are performed as in the climb phase, for the cases Nd>Max(CRZ Fli) and current level of the aircraft<Nd<Max(CRZ Fli)
Else (the flight phase is a descent phase),
    the clearance is rejected through a message "UNABLE" to ATC
Endif (UM28) The clearance being of the form "descend to reach a determined level Nd at or before a determined time Hd" or "DESCEND TO REACH Nd by Hd", the update of the flight plan which comprises segments consists in introducing the following programme into the flight plan of the FMS.
If A/C Alt<=Nd, then
    the clearance is rejected through a message "UNABLE" to the ATC Else
        If the flight phase is a take off or climb phase
        the clearance is rejected through a message "UNABLE" to ATC
    Else if the flight phase is a cruising phase
        If Nd>Min_level_Cruise
        The cruising altitude is reassigned to the value Nd
        The predictions are recalculated, in particular the time HHMMSS1 at which the level Nd is predicted
        If HHMMSS1<Hd then
        The request is accepted
        Else
    An attempt is made to descend more steeply. To do this a prediction is performed by taking as holding speed VMO/MMO. The predictions are recalculated, in particular the time HHMMSS2 at which the level Nd is predicted.
        If HHMMSS2<Hd then
        The speed is frozen at VMO/MMO and the request is accepted
        Else
        the clearance is rejected through a message "UNABLE" to ATC
        Endif
    Endif
    Else (Nd<=Min_level_Cruise)
    The altitude to be lowered delta-Alt=AC Alt−Nd is calculated, on the time slot Delta_T=Hd−current time
    The slope (in ft/min) making it possible to lower the altitude Delta_Alt in Delta_T: [Slope]=Delta_Alt/Delta_T is determined The slope [Slope] is compared with the reachable slope [Slope_Perfo] having regard to the speed of the aircraft and to its descent performance, arising from the performance database.

If [Slope]<[Slope_Perfo] then
    The request is accepted and a flight plan is calculated, erasing any altitude constraint of value greater than parameter Nd, and predicting an immediate descent, by reassigning the altitude to the parameter Nd through the clearance "CLR ALT" via the FMU interface ("Flight Management Unit") between the crew and the FMS and FG systems,
Else
    The maximum reachable slope having regard to the performance of the aircraft, slats and flaps extended, is calculated by taking the maximum reachable descent speed: [Slope_Perfo_Max]
    If [Slope]<[Slope_Perfo_Max] then
        The request is accepted and a flight plan is calculated, erasing any altitude constraint of value greater than the parameter Nd, and predicting an immediate descent, by reassigning the altitude to the parameter Nd through the clearance "CLR ALT" via the FCU,
    Else
        the clearance is rejected through a message "UNABLE" to ATC
    Endif
Endif
Endif
Else (the flight phase is a descent phase)
    The same calculations are performed as for the cruising case where Nd<=Min_level_Cruise)
Endif (UM29) The clearance being of the form "descend to reach a determined level Nd at or before a determined position Pd" or "DESCEND TO REACH Nd BY Pd", the updating of the flight plan which comprises segments consists in introducing the following programme into the flight plan of the FMS.
If A/C Alt<=Nd, then
    the clearance is rejected through a message "UNABLE" to ATC
Else
    If the flight phase is a take off or climb phase:
    the clearance is rejected through a message "UNABLE" to ATC
    Else if the flight phase is a cruising phase
    If Nd>Min_level_Cruise
    The cruising altitude is reassigned to the value Nd
    The altitude predictions Alt-Pos are recalculated at the point Pd
    If Alt-Pos=Nd then
    The request is accepted
    Else, if Alt-Pos<Nd (i.e. the point Pd is in the descent phase)
    the clearance is rejected through a message "UNABLE" to ATC.
    Else (Alt-Pos>Nd i.e. the point is on the descent segment between the aircraft and the parameter Nd)
    An attempt is made to descend more steeply. To do this a prediction is performed taking as holding speed VMO/MMO. The predictions are recalculated, in particular the altitude Alt-Pos2 predicted at the point Pd
    If Alt-Pos2=Nd then
    The speed is frozen at VMO/MMO and the request is accepted
    Else
    the clearance is rejected through a message "UNABLE" to ATC
    Endif
    Endif
    Else (Nd<=Min_level_Cruise: this involves descending to a descent point)

A descent constraint is placed on the parameter Pd at the value Nd.

If the altitude predicted on the parameter Pd is equal to the parameter Nd, then the request is accepted
　Else
　　the clearance is rejected for a message "UNABLE" to ATC (in fact, this means that the constraint altitude is incompatible with a descent to the airport)
　　Endif
　Endif
　Else (the flight phase is a descent phase)
　　The same calculations are performed as for the cruising case where Nd<=Min_level_Cruise)
　Endif (UM209) The clearance being of the form "reach a determined level Nd at or before a determined position Pd" or "REACH Nd BY Pd", the updating of the flight plan which comprises segments consists in introducing the following programme into the flight plan of the FMS.
　If the flight phase is a take off or climb phase
　　The message is treated as a UM27 message
　Else if the flight phase is a descent or approach phase
　　The message is treated as a UM29 message
　Else (the flight phase is a cruising phase)
　If Nd>A/C Alt, then
　　The message is treated as a UM27 message
　Else
　　The message is treated as a UM29 message
　Endif
　Endif (UM192) The clearance being of the form "reach a determined level Nd at or before a determined time Hd" or "REACH Nd by Hd", the updating of the flight plan which comprises segments consists in introducing the following programme into the flight plan of the FMS.
　If the flight phase is a take off or climb phase
　　The message is treated as a UM26 message
　Else if the flight phase is a descent or approach phase
　　The message is treated as a UM28 message
　Else (the flight phase is a cruising phase)
　If Nd>A/C Alt, then
　　The message is treated as a UM26 message
　Else
　　The message is treated as a UM28 message
　Endif
　Endif (UM 78) The clearance being of the form "at a determined level Nd, proceed directly to a determined position Pd" or "AT Nd PROCEED DIRECT TO Pd", the updating of the flight plan which comprises segments consists in introducing the following programme into the flight plan of the FMS.
　Initialization:
　The current flight plan is stored in a backup memory.
　The following calculations are performed cyclically starting from the flight plan saved in the backup memory.
　Step 0: processing of the limit values
　If Nd>Max(CRZ Fli) the clearance is rejected through a message "UNABLE" to ATC.
If Nd<Min(altitudes predicted on the flight plan), the clearance is rejected through a message "UNABLE" to ATC.
　The minimum of the altitudes predicted for a transport aircraft for example performing a journey from a departure airport to an arrival airport is Min(A/C Alt, ARR Alt).
　Step 1: typical case
　If the flight phase is a take off, climb or go-around phase
　On the climb segment (i.e. the part of the climb profile):
　　We search for the first segment [WPi, WPi+1] for which the predicted altitudes Alt(WPi), Alt(WPi+1), are such that: Alt(WPi)<Nd<Alt(WPi+1)
　If Pd is before WPi+1 then
　the clearance is rejected through a message "UNABLE" to ATC
　Specifically, no backtracking is done, i.e. before the point WPi, and the clearance "DIRECT TO WPi+1" starting from an altitude reached just before is of no use since one is already aligned on the segment, to WPi+1 at the time at which the parameter Nd is reached
　Else
　A pseudo waypoint is created on the path, at the place where the parameter Nd is reached.
　This pseudo waypoint is named with the numerical value of the altitude parameter Nd, between parentheses to indicate that this is not a fixed point on the ground, but a floating point, whose position on the path depends on the predictions. For example, if the altitude parameter Nd equals 28 000 ft, the pseudo waypoint is named (28 000). In what follows, this point is designated HHHHH.
　A "DF" leg (Direct to Fix) is created starting from the point HHHHH with the parameter Pd as the value of "Fix"
　Endif
　On the cruising segment:
　For each cruising level denoted CRZ FLi (i=1 . . . N), the start of the level is denoted Start(CRZ FLi) and the end of the level End(CRZ FLi). This may be a waypoint or else a pseudo waypoint of the type (S/C, (T/C), (S/D), (T/D).
　A search is made through the N cruising levels [CRZ FL1, CRZ FL2, . . . , CRZ FLN] for the first pair of two consecutive levels [CRZ FLi; CRZ FLi+1] such that the parameter CRZ FLi<Nd<CRZ FLi+1 (if this is a climb level) or CRZ FLi>Nd>CRZ FLi+1 (if this a descent level)
　We therefore have the relation: Alt(End(CRZ FLi))<Nd<Alt(Start(CRZ FLi+1)) in the case of the climb level and Alt(End(CRZ FLi))>Nd>Alt(Start(CRZ FLi+1)) in the case of the descent level.
　If Pd is before End(CRZ FLi) then
　the clearance is rejected through a message "UNABLE" to ATC, since no backtracking is done, i.e. before the position End(CRZ FLi).
　Else
　A pseudo waypoint is created on the path, at the place where the parameter Nd is reached; as indicated above it is denoted HHHHH.
　A "DF" (Direct to Fix) leg is created starting from the point HHHHH with the parameter Pd as the value of fix
　Endif
　Endif
　If the flight phase is a cruising phase
　The calculations are performed, identical to the calculations above for the cruising segment part.
　For the descent segment part:
　Look for the first segment [WPi,WPi+1] for which the predicted altitudes Alt(WPi), Alt(WPi+1) are such that: Alt(WPi+1)<Nd<Alt(WPi)
　If Pd is before WPi then
　reject the clearance with an "UNABLE" message to ATC since there will be no backtracking, i.e. before the point WPi+1, and the DIRECT TO on WPi starting from an altitude reached just before is useless since the aircraft is already aligned on the segment, to WPi at the moment when the Nd parameter is reached.
　Else
　Take A=Nd
　Save the flight plan in FPLN REF Assume N to be a maximum number of iterations Take i=1

On the path of the flight plan FPLN REF, create a pseudo waypoint, at the position where the A parameter is reached. This pseudo waypoint is attached to an attachment point, which is either the waypoint that precedes it if there is one, or the current position (saved) of the aircraft if there is no waypoint between the airplane and the pseudo waypoint: its coordinates are therefore calculated based on the attachment point denoted Patt and the curvilinear distance along the path between the attachment point and the pseudo waypoint denoted Datt.

This pseudo waypoint is named with the numeric value of the altitude parameter Nd; as indicated above it is denoted HHHHH.

Create a leg "DF" (Direct to Fix) starting from the point HHHHH with the Pd parameter for the "fix" value.

Recalculate the vertical profile with the new lateral path.

Reposition the HHHHH point using its coordinates (i.e. its position on the path is calculated with respect to the attachment point Patt and the distance Datt).

As long as Alt[HHHHH]<>Hd and i<N, perform the following loop:

Calculate the vertical difference between the HHHHH point and the altitude A:

DeltaH=Alt(HHHHH)−$A$

Take: $A=Hd+$DeltaH (This means that if the predicted altitude at the HHHHH point is below the Hd parameter, a calculation will be redone starting from a lower altitude, i.e., the path is shortened).

On the path of the flight plan FPLN REF, create an HHHHH pseudo waypoint, at the position where the parameter A is reached.

Create a leg "DF" (Direct to Fix) starting from the HHHHH point created with the Pd parameter for the fix value Recalculate the vertical profile with the new lateral path.

Reposition the HHHHH point using its coordinates.

$i=i+1$

End While

Endif

Endif

Step 2: management of degraded cases

At the end of step 1, recalculate the predictions of the new flight plan.

Therefore, on completion of step 1, check the validity of the data by performing the calculation of step 0, on the new flight plan.

If the tests are not good then reject the clearance with an "UNABLE" message to ATC and return to the initial flight plan which is recovered in the backup memory.

Endif

The clearance "At Nd Direct To Pd" has been illustrated, in the climb phase (FIGS. 2a, 2b and 3a, 3b) and descent phase (FIGS. 4a, 4b), with Nd the altitude of the floating point denoted 28 000 and Pd being WP1. Represented in each figure is a lateral path L and the associated vertical profile V, before recalculating the new paths (Figures a) and after (Figures b).

Figure 2A:
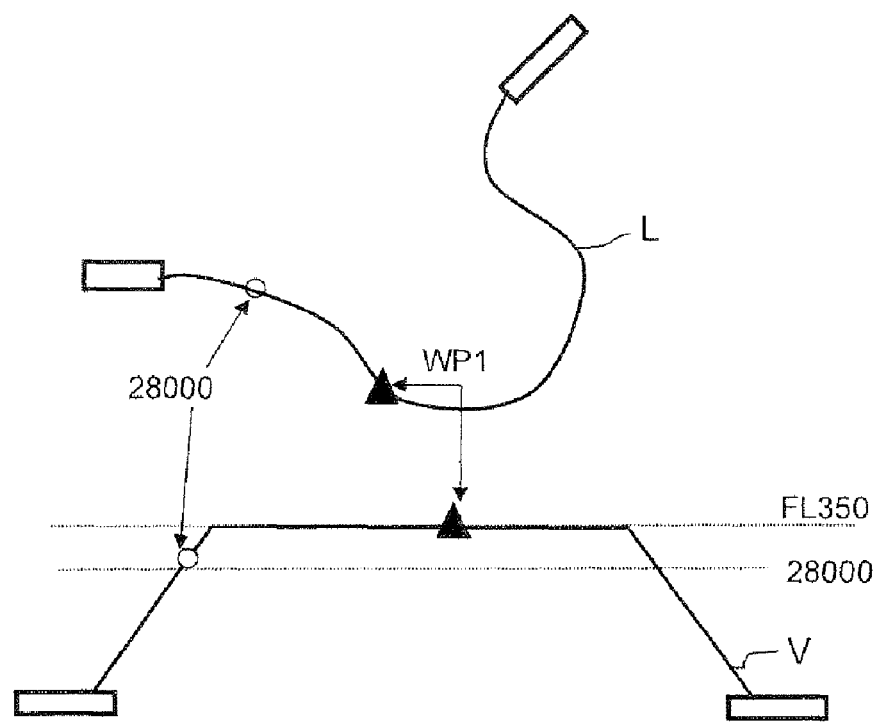
Figure 2B:
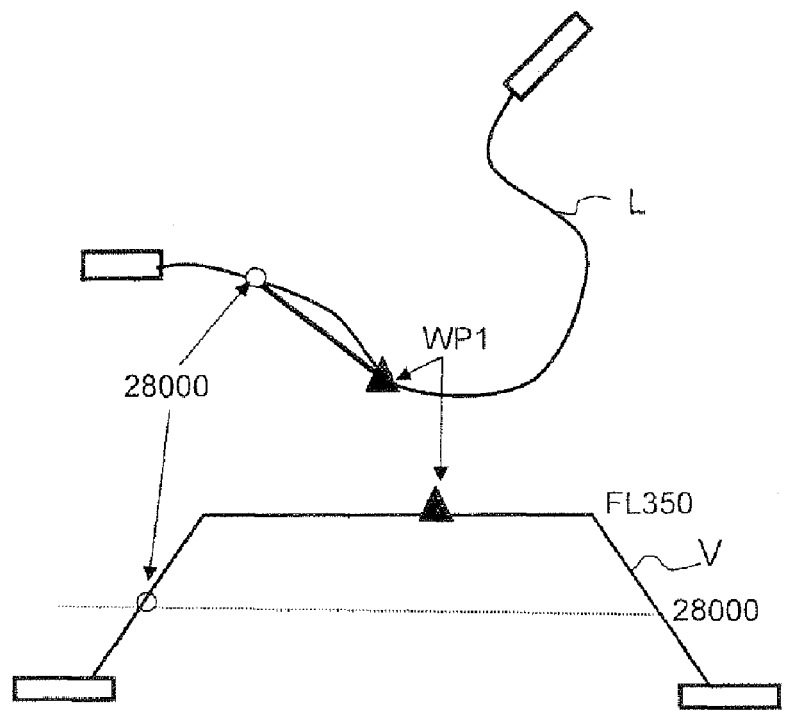

With reference to FIGS. 2a and 2b, the "28 000" points are unchanged before and after the recalculation, but the lateral and vertical paths are shortened.

If the "DIRECT TO" has significantly shortened the path, it may be that the new predictions will remove the altitude parameter Nd from the limit values.

Figure 3A:
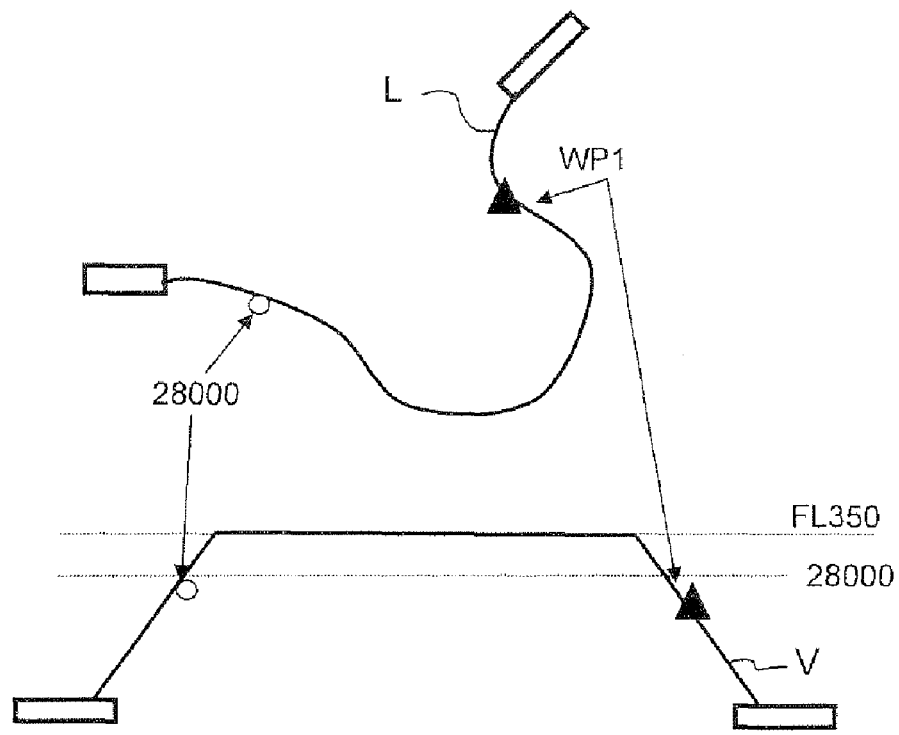
Figure 3B:
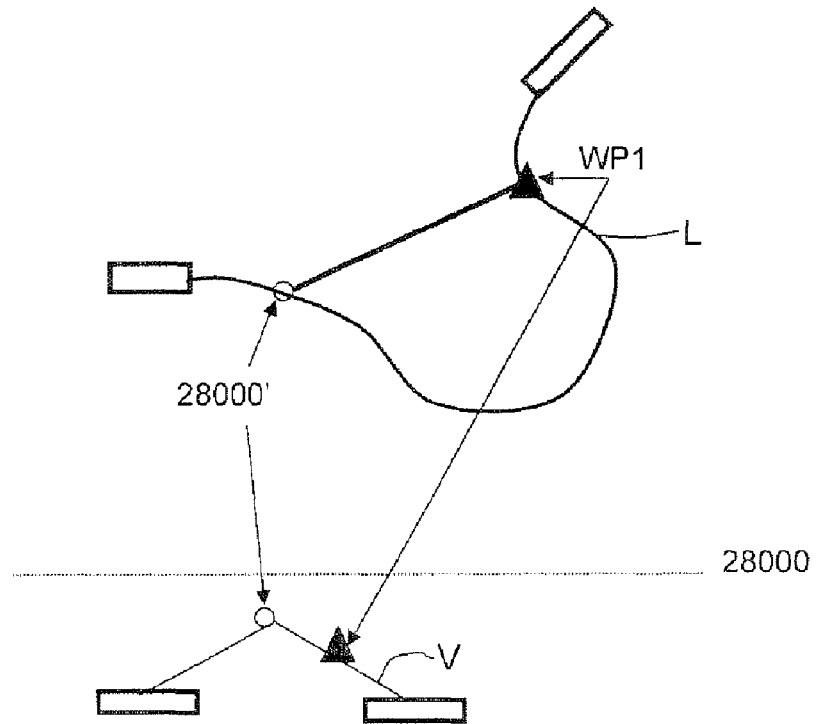

With reference to FIGS. 3a and 3b, the paths are greatly shortened but the aircraft cannot reach the "28 000" altitude before beginning its Direct To WP1; the "28 000" point no longer exists for the recalculated paths of FIG. 3b and the vertical climb profile and the descent profile intercept one another below the "28 000" altitude. The departure point of the Direct To is denoted 28 000'. This case is denoted the Wilkinson case.

Figure 4A:
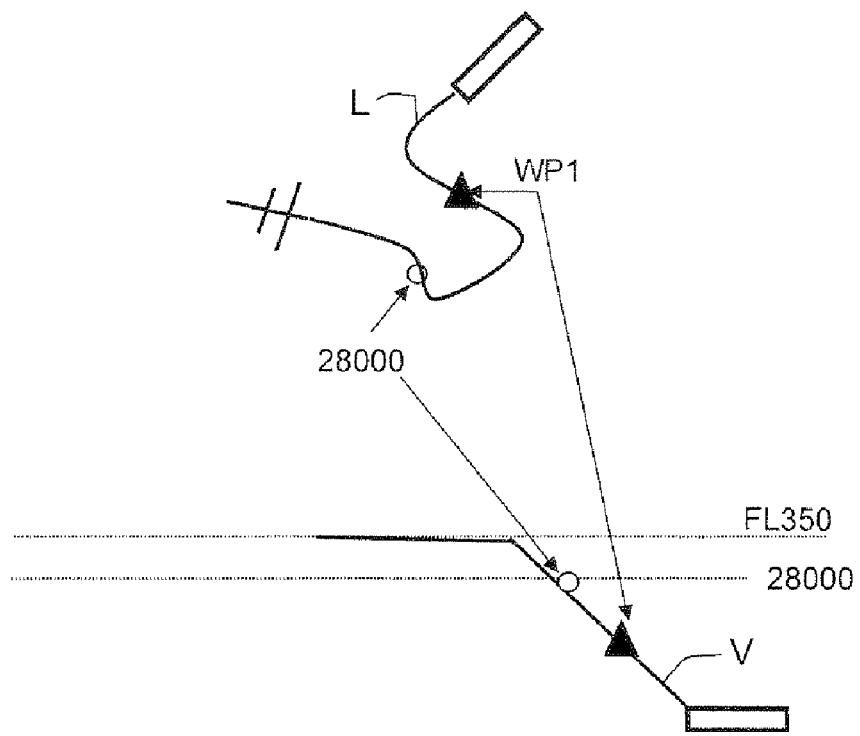
Figure 4B:
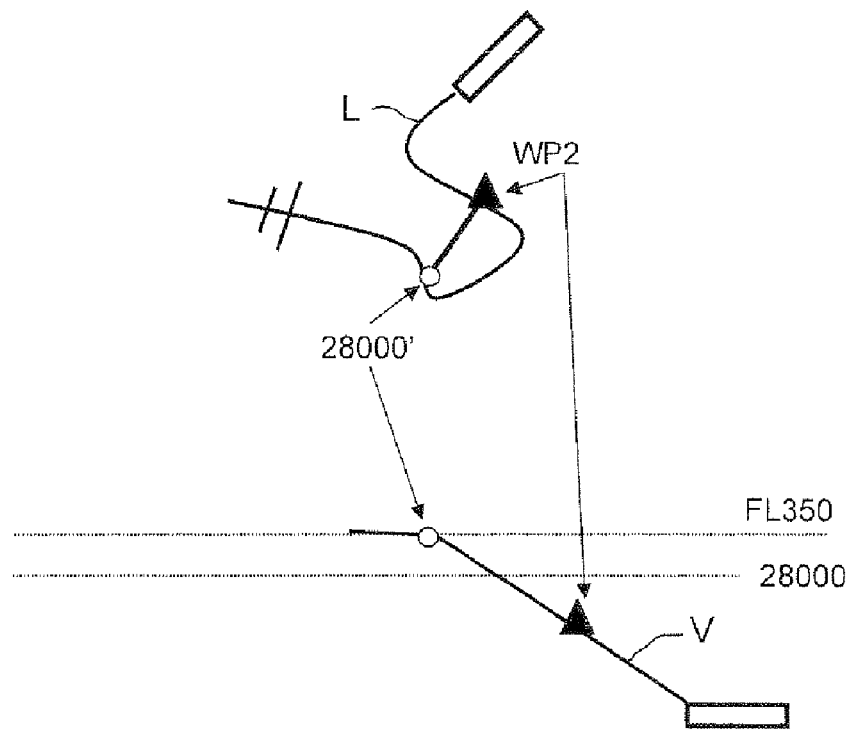

With reference to FIGS. 4a and 4b, the paths are shortened and the aircraft cannot reach the waypoint WP1 starting from the 28 000 altitude as provided by the clearance since the descent would be too steep; we therefore start from a point 28 000 upstream on the path (hence situated at a higher altitude denoted 28 000') which does not allow the paths to be shortened as much.

The invention claimed is:

1. A method of assisting in navigation of an aircraft, comprising:
   receiving, by a ground/on board communication system, a new clearance originating from an air traffic control authority; and
   updating, by a flight management system linked to the communication system upon receipt of the new clearance, without intervention of a pilot of the aircraft, a flight plan which includes a lateral path and a vertical profile associated with clearances, the flight plan being updated according to a flight phase of the aircraft and the new clearance, wherein the new clearance comprises an action conditional on the flight plan associated with a floating point of the lateral path and/or of the vertical profile.

2. The method according to claim 1, wherein the new clearance requests the aircraft to climb to reach a determined level at or before a determined time.

3. The method according to claim 1, wherein the new clearance requests the aircraft to climb to reach a determined level at or before a determined position.

4. The method according to claim 1, wherein the new clearance requests the aircraft to descend to reach a determined level at or before a determined time.

5. The method according to claim 1, wherein the new clearance requests the aircraft to descend to reach a determined level at or before a determined position.

6. The method according to claim 1, wherein the new clearance requests the aircraft to reach a determined level at a determined position.

7. The method according to claim 1, wherein the new clearance requests the aircraft to reach a determined level at a determined time.

8. The method according to claim 1, wherein the new clearance requests the aircraft to, at a determined level, proceed directly to a determined position.

9. A method of modifying a flight plan of an aircraft by a flight management system onboard the aircraft, the method comprising:
   receiving a clearance instruction from an air traffic control authority, the clearance instruction comprising an action to be performed upon occurrence of a condition;
   determining if modifying the flight plan is achievable according to: the clearance instruction, a flight phase of the aircraft, and at least one of a longitudinal speed of the aircraft providing the best lift-over-drag ratio in a clean configuration of the aircraft (Green Dot) or a maximum longitudinal speed of the aircraft (VMO/MMO); and
   sending a rejection message to the air traffic control authority if it is determined that modifying the flight plan according to the clearance instruction and at least one of the Green Dot or VMO/MMO is not achievable; and modifying the flight plan if it is determined that modifying the flight plan according to the clearance instruction and at least one of the Green Dot or VMO/MMO is achievable.

10. The method of claim 9, wherein the clearance instruction requests the aircraft to climb to reach a determined level at or before a determined time, and the determination comprises:

generating a pseudo-waypoint in the flight plan according to the clearance instruction at which the condition of the clearance instruction is estimated to occur; and comparing the time parameter of the pseudo-waypoint and the determined time.

11. The method of claim 9, wherein the clearance instruction requests the aircraft to climb to reach a determined level at or before a determined position, and the determination comprises:

calculating an altitude prediction at the determined position; and comparing the altitude prediction and the determined level.

12. The method of claim 9, wherein the clearance instruction requests the aircraft to descend to reach a determined level at or before a determined time, and the determination comprises:

generating a pseudo-waypoint in the flight plan according to the clearance instruction at which the condition of the clearance instruction is estimated to occur; and comparing the time parameter of the pseudo-waypoint and the determined time.

13. The method of claim 9, wherein the clearance instruction requests the aircraft to descend to reach a determined level at or before a determined position, and the determination comprises:

calculating an altitude prediction at the determined position; and comparing the altitude prediction and the determined level.

14. The method of claim 9, wherein the clearance instruction requests the aircraft to reach a determined level at a determined position, and the determination comprises:

calculating an altitude prediction at the determined position; and comparing the altitude prediction and the determined level.

15. The method of claim 9, wherein the clearance instruction requests the aircraft to reach a determined level at a determined time, and the determination comprises:

generating a pseudo-waypoint in the flight plan according to the clearance instruction at which the condition of the clearance instruction is estimated to occur; and comparing the time parameter of the pseudo-waypoint and the determined time.

16. The method of claim 9, wherein the clearance instruction requests the aircraft to start moving toward a determined position directly at a determined level, the determination comprises generating a pseudo-waypoint in the flight plan according to the clearance instruction at which the condition of the clearance instruction is estimated to occur, and the modifying the flight plan comprises generating a flight plan element directing the aircraft to go to the determined position from the pseudo-waypoint.

* * * * *